United States Patent [19]
Nakaoka et al.

[11] Patent Number: 6,167,125
[45] Date of Patent: Dec. 26, 2000

[54] COMMUNICATION APPARATUS AND COMMUNICATION METHOD

[75] Inventors: Akira Nakaoka; Hidemi Takehiro, both of Higashihiroshima, Japan

[73] Assignee: Sharp Kabushiki Kaisha, Osaka, Japan

[21] Appl. No.: 09/290,412

[22] Filed: Apr. 13, 1999

[30] Foreign Application Priority Data

May 29, 1998 [JP] Japan ................................. 10-150452

[51] Int. Cl.⁷ .................................................. H04M 1/56
[52] U.S. Cl. .................... 379/142; 379/88.21; 379/93.23
[58] Field of Search .............................. 379/88.19, 88.2, 379/88.21, 93.23, 120, 127, 142, 245–247, 354

[56] References Cited

U.S. PATENT DOCUMENTS 5,402,469  3/1995  Hopper et al. ........................ 379/201
5,606,602  2/1997  Johnson et al. ....................... 379/115

FOREIGN PATENT DOCUMENTS 3-112246   5/1991   Japan .
4-14353    1/1992   Japan .
6-334776   12/1994  Japan .
8-274895   10/1996  Japan .
9-46740    2/1997   Japan .
9-148228   6/1997   Japan .

*Primary Examiner*—Duc Nguyen
*Attorney, Agent, or Firm*—Nixon & Vanderhye, P.C.

[57] ABSTRACT

An object of the present invention is to make it possible to utilize information service provided by a carrier without designating a standard protocol as a communication network. A plurality of carriers provide information services to a communication network to which a called terminal unit is connected through a communication line. At the time of termination, a carrier control signal transmitted from the communication network includes a calling line number for identifying an originator, carrier information for identifying a carrier, and carrier service information for identifying a service to be provided. When a plurality of terminals are connected to the called terminal unit as slave units, a function of inter-calling a terminal-number provided by a carrier can be utilized. Carrier information identifying means identifies a carrier on the basis of the carrier information, and carrier-service-information-identifying means controls a terminal selecting circuit on the basis of the carrier service information.

8 Claims, 4 Drawing Sheets

COMMUNICATION APPARATUS AND COMMUNICATION METHOD

BACKGROUND OF THE INVENTION

1. Field of the Invention

The present invention relates to a communication apparatus which is connected to a communication network such as a public telephone line, or with which communication is carried out through the communication network, and a communication method therefor.

2. Description of the Related Art

Conventionally, communication terminal units such as various telephone sets can be connected to a public switched telephone network (hereinafter referred to as a "PSTN") using a public telephone line. For example, in a cordless telephone set, a master unit is connected to the PSTN in a wired state, and a plurality of slave units are connected to the master unit in a wireless state. Even such a cordless telephone set having a plurality of terminal units is handled as one terminal unit for the PSTN. For example, when a terminal unit connected to the PSTN serves as an originating side and calls a cordless telephone set, the originating side performs calls the cordless telephone set of the called side by using a telephone number corresponding to the master unit of the cordless telephone set of the called side. An exchange in the PSTN calls the master unit of the cordless telephone set corresponding to the telephone number sent from the terminal unit of the originating side. The master unit of the cordless telephone set called from the exchange of the PSTN connects all the slave units in a wireless state, and the master unit and all the slave units output termination ringings.

When terminal units have message exchange functions, assume that a message is transmitted from an originating terminal unit to a called terminal unit. In this case, when a telephone number corresponding to the called terminal unit is originated from the originating terminal unit, an exchange of the PSTN calls a terminal unit corresponding to the received telephone number. The called terminal unit outputs termination ringings and waits for a response executed by a user of the called terminal unit. At this time, assume that the called terminal unit is an automatic answering telephone set and set to execute an automatic recording function. In this case, after a predetermined number of termination ringings are made, an automatic answering operation is started to record a message transmitted from the originating terminal unit. A prior art related to an automatic answering telephone set is disclosed, for example, in Japanese Unexamined Patent Publications JP-A 3-112246 (1991), JP-A 4-14353 (1992).

When a plurality of terminal units including a master unit are connected to the PSTN, there is a demand for a function that only the master unit or one slave unit designated of a cordless telephone is called. For example, when slave units of a home cordless telephone set are individually assigned to a plurality of members of a family, it may be of occurrence that calling all the slave units is not necessarily required, but calling only one slave unit designated is desired. However, in the present PSTN, there is no protocol for designating inter-calling termination, and a terminal unit has no means for identifying inter-calling termination information from the communication network. For this reason, even when one slave unit of the cordless telephone set must be called, ringing of the master unit and all the slave units is performed.

In addition, in the PSTN, there is no protocol for designating message communication, and a terminal unit has no function of identifying message information from the communication network. For this reason, the message cannot be received to be processed in a normal termination condition.

Further, since a terminal unit connected to the PSTN has no function of identifying a carrier, a type 1 carrier participating in the PSTN cannot provide an unique information service and must be standardized to start a new service.

SUMMARY OF THE INVENTION

Accordingly, an object of the present invention is to provide a communication apparatus capable of effectively using an information service unique to a carrier which has not been standardized and a communication method therefor.

The present invention provides a communication apparatus connected to a communication network in which a plurality of carriers respectively provide unique information services, comprising:

carrier-identifying means for identifying a carrier on the basis of carrier information included in a control signal from the communication network; and information processing means for extracting information related to an information service unique to the carrier on the basis of the carrier information identified by the carrier-identifying means to perform a process which is predetermined for the extracted information.

According to the invention, the plurality of carriers provide the corresponding unique information services to the communication network to which the communication apparatus is connected. The communication apparatus comprises the carrier-identifying means and information processing means. The carrier-identifying means identifies a carrier on the basis of carrier information included in the control signal from the communication network. The information processing means extracts information unique to the identified carrier and performs a process which is predetermined for the information. The information processing means extracts information unique to each carrier which provides an information service to the communication network to perform the predetermined process.

Therefore, the carrier can provide the unique information service, and the terminal unit can effectively utilize an information service which is newly provided. Even if a standard protocol for designating an information service is not set to the communication network, the information service unique to the carrier can be utilized in a called terminal unit.

In the invention, the information processing means comprises:

service-identifying means for, on the basis of predetermined service information, identifying an information service provided by the carrier identified by the carrier-identifying means when a plurality of terminal units are connected thereto; and terminal inter-calling means for inter-calling a terminal unit corresponding a designated terminal-number when the service information identified by the service-identifying means is a terminal designation number.

According to the invention, even if the plurality of terminal units are connected, the information service provided by the carrier identified by the carrier-identifying means is identified by the service-identifying means. When a terminal designation number exists in the identified service information, the terminal unit corresponding to the designated terminal-number is inter-called by the terminal inter-calling means. For this reason, an individual terminal unit can be easily called without a standard protocol representing an inter-call.

More specifically, when a plurality of terminal units which have a master-and-slave relationship are connected to the communication network as one terminal unit, one of the terminal units can be called by using an information service provided by a carrier without setting a standard protocol for designating one terminal unit.

In the invention, the information processing means comprises:

service-identifying means for, on the basis of predetermined service information, identifying a information service provided by the carrier identified by the carrier-identifying means; and message processing means for, when the service information identified by the service-identifying means is message information, performing a predetermined process for the message information.

According to the invention, the carrier-identifying means identifies an information service provided by the carrier on the basis of the predetermined service information. When the identified service information is message information, a predetermined process such as a display process by a character string or notification by sound synthesis is performed for the message information by the message processing means. Even if the communication network cannot represent transmission of a message as a standard protocol, the message can be transmitted/received in the case where a carrier provides a service for handling a message.

More specifically, a message can be transmitted/received by using an information service provided by a carrier without setting a standard protocol for transmitting/receiving a message in the communication network.

In the invention, the communication network has a function of transmitting originator information to a called terminal unit, and the called terminal unit processes the originator information transmitted from the communication network.

According to the invention, the originator information is transmitted from the communication network to the called terminal unit, and the originator information is processed by the terminal unit. For this reason, the originator information can be effectively utilized together with an information service from a carrier.

More specifically, since the communication network comprises the function of transmitting originator information from the communication network to the called unit, the called terminal unit can utilize the originator information together with an information service provided by a carrier.

Further, the invention provides a communication method utilizing a communication network having a function of transmitting originator information to a called terminal unit at the time of termination, comprising:

making the communication network available for selection of a plurality of carriers; and transmitting carrier-identifying information unique to a selected carrier together with the originator information from the communication network to the called terminal unit.

According to the invention, when communication is performed through the communication network having the function of transmitting originator information to the called terminal, a plurality of carriers can be selected, and together with the originator information, additional carrier-identifying information unique to a carrier selected is transmitted from the communication network to the called terminal unit. For this reason, the called terminal unit can identify and utilize not only the originator information but also an information communication service unique to the carrier.

More specifically, a carrier can provide an unique information service by using the communication network having the function of transmitting originator information to the called terminal unit, and the called terminal unit can utilize the information service provided from the carrier together with the originator information.

In the invention, when a terminal-number of the called terminal unit and additional information are inputted by an originating terminal unit, carrier service information corresponding to the additional information is transmitted together with the originator information and the carrier-identifying information from the communication network to the called terminal unit.

According to the invention, when the terminal-number of the called terminal unit and the additional information are inputted by the originating terminal unit, carrier service information corresponding to the additional information, as well as the originator information and the carrier-identifying information are transmitted together with the terminal-number from the communication network to the called terminal unit. When a plurality of terminal units are connected as the called terminal unit, calling to a terminal unit designated by the terminal-number is performed, and the service information of the carrier can be utilized.

BRIEF DESCRIPTION OF THE DRAWINGS

Other and further objects, features, and advantages of the invention will be more explicit from the following detailed description taken with reference to the drawings wherein.

DETAILED DESCRIPTION OF THE PREFERRED EMBODIMENTS

Figure 1:
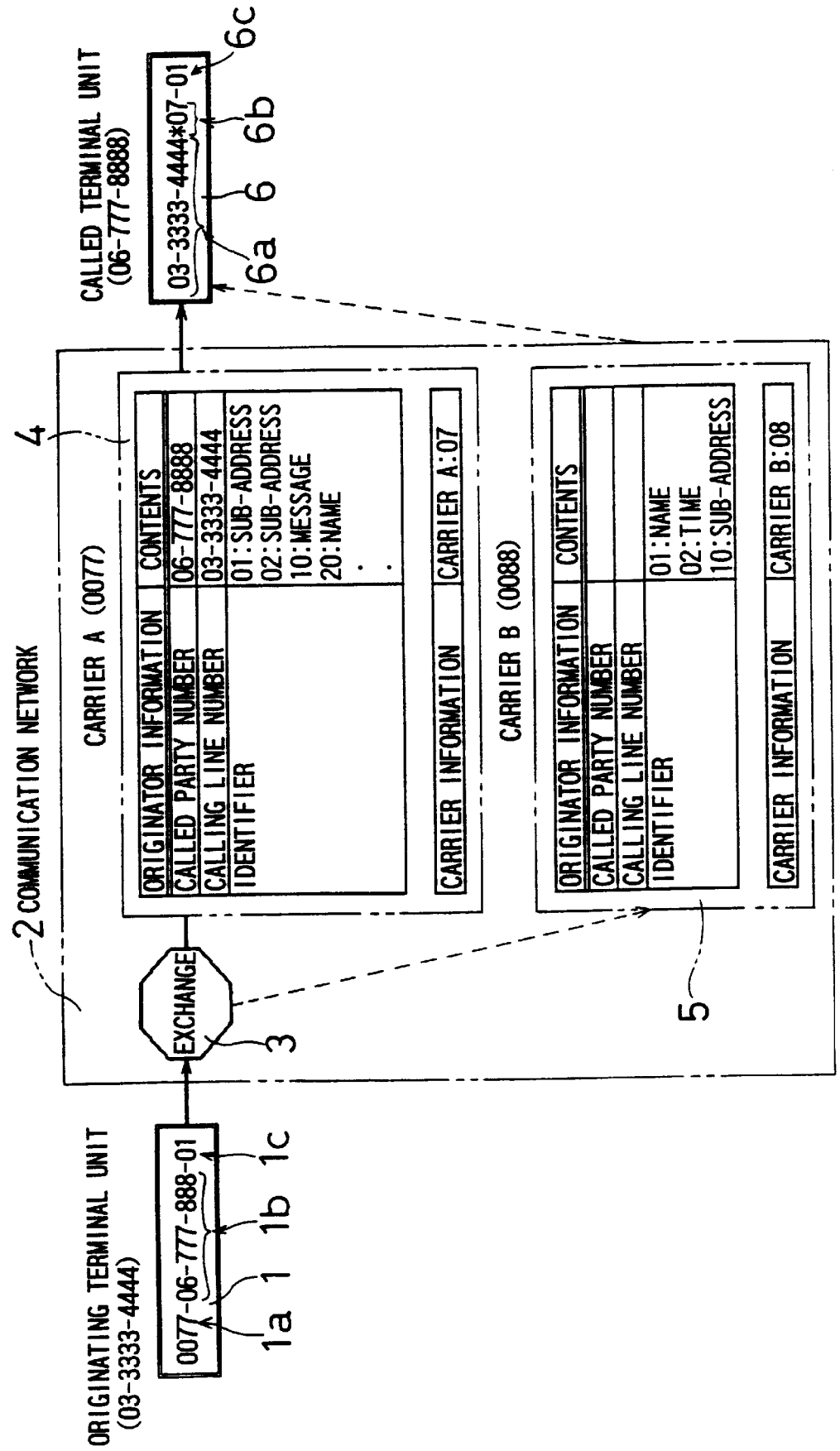
FIG. 1 is a block diagram showing the outline of a communication method according to an embodiment of the present invention.

Now referring to the drawings, preferred embodiments of the invention are described below.

Figure 2:
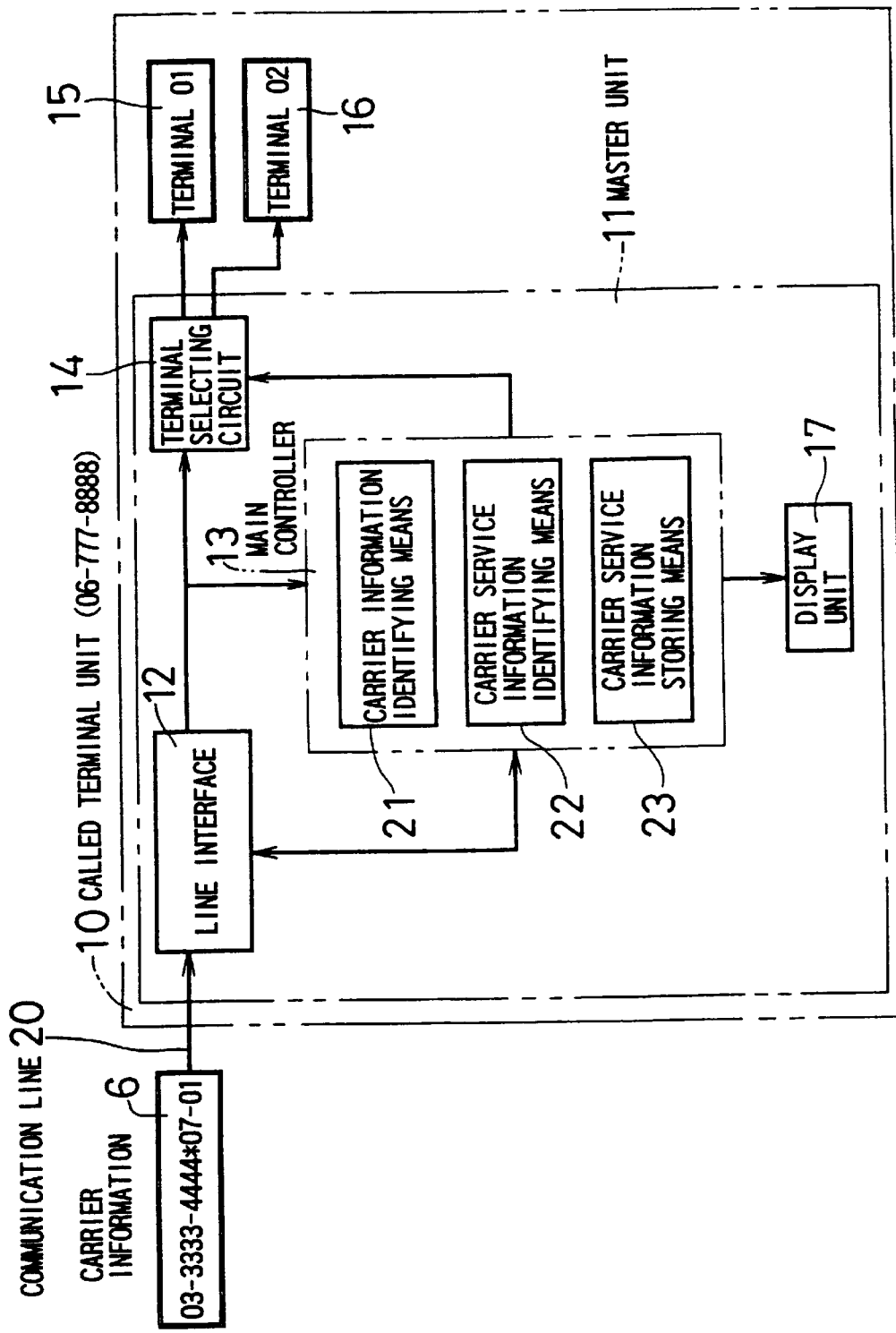
FIG. 2 is a block diagram showing a schematic electric configuration of a called terminal unit 10 used in the communication method in FIG. 1.
Figure 3:
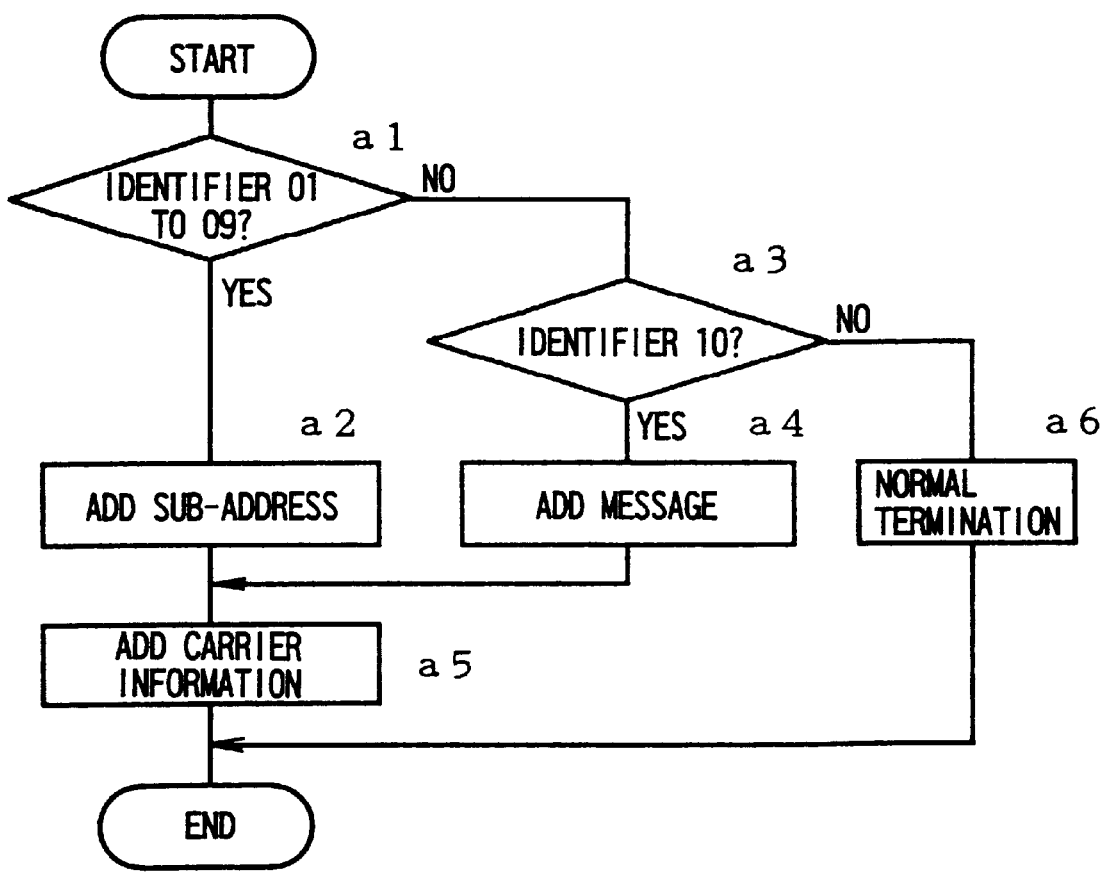
FIG. 3 is a flow chart showing an operation procedure of a communication network 2 in FIG. 1.
Figure 4:
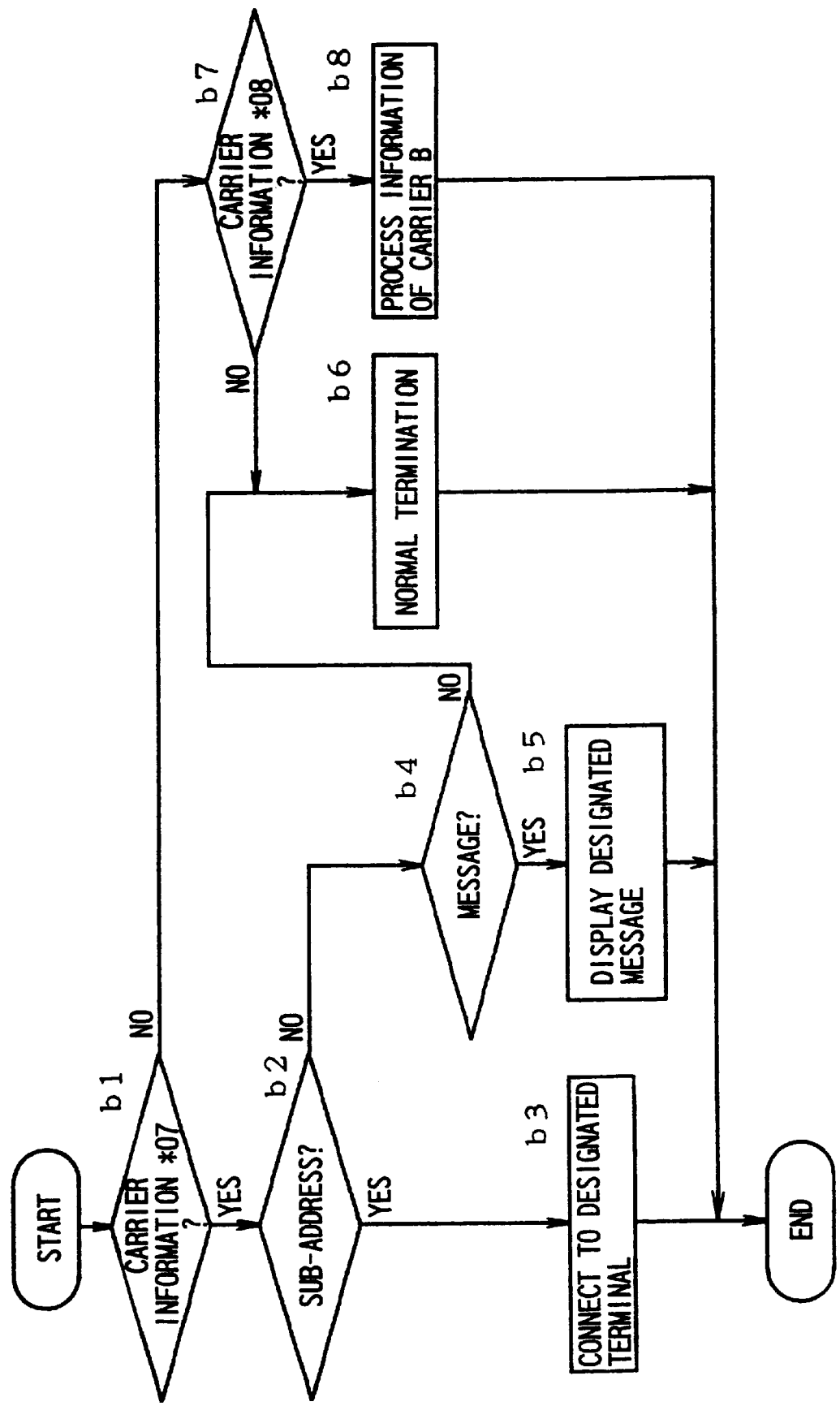
FIG. 4 is a flow chart showing an operation procedure of the called terminal unit 10 in FIG. 2.

FIG. 1 shows the outline of a communication method in a communication network according to an embodiment of the invention. FIG. 2 shows a schematic electric configuration of a terminal unit used in the communication method in FIG. 1. FIG. 3 shows an operation procedure in the communication network in FIG. 1, and FIG. 4 shows an operation procedure of the terminal unit in FIG. 2 at the time of termination. As shown in FIG. 1, according to the communication method of the invention, originator information 1 is transmitted from an originating terminal unit to a communication network 2. The communication network 2 is a PSTN and includes an exchange 3 and a plurality of carriers 4 and 5. The exchange 3 selects one of the plurality of carriers 4 and 5 on the basis of the originator information 1 to transmit the originator information 1. The carriers 4 and 5 provide various information communication services to the communication network 2. A carrier control signal 6 is transmitted from selected one of the carriers 4 and 5 to a called terminal unit.

Referring to FIG. 1, assume that the telephone number of the originating terminal unit is, e.g., 03-3333-4444, and that the telephone number of the called terminal unit is 06-777-8888. The originator information 1 includes a carrier number 1a for designating the carrier 4 serving as one of the plurality of carriers, a called party number 1b, and an identifier 1c. The carrier control signal 6 is comprised of a calling party number 6a, carrier information 6b unique to the connected carrier, and carrier service information 6c.

As shown in FIG. 2, the carrier control signal 6 shown in FIG. 1 is given to a called terminal unit 10 having a called party number of 06-777-8888. The called terminal unit 10 includes a line interface 12, a main controller 13, and a terminal selecting circuit 14 as a master unit 11. Terminals 15 and 16 serving as a plurality of slave units are connected to the master unit 11 in a wireless state. The master unit 11 is connected to the communication network 2 through a wire communication line 20. In the line interface 12 in which the carrier control signal 6 is notified through the wire communication line 20 when the called terminal unit 10 is called, connection/disconnection to/from the wire communication line 20 is performed. The main controller 13 performs various control operations associated with originating, terminating, or the like and a call according to a preset program, and comprises carrier-information-identifying means 21, carrier-service-information-identifying means 22, and carrier service information storing means 23. The carrier-information-identifying means 21 identifies the carrier information 6b from the carrier control signal 6 inputted through the line interface 12 at the time of termination. Similarly, the carrier-service-information-identifying means 22 identifies the carrier service information 6c from the carrier control signal 6 transmitted from the line interface 12 at the time of termination. In the carrier service information storing means 23, service codes of carriers and service contents of the codes are stored in advance. The terminal selecting circuit 14 is connected to the line interface 12, and selects the terminals 15 and 16 serving as slave units on the basis of a control signal from the main controller 13. A display unit 17 displays the carrier information 6b and the carrier service information 6c notified through the line interface 12 and the main controller 13. As this display, a simple display made by lighting a light-emission diode (LED) or the like, a character display made by a liquid-crystal display element (LCD), or an acoustic output formed by sound synthesis can also be used to perform notification. The calling line number 6a or the like can be especially displayed on the display unit 17 as the originator information 1 transmitted from the communication network 2.

As shown in FIG. 3, when the originating terminal unit performs calling of the called terminal unit including the originator information 1 for the exchange 3 of the communication network 2, the exchange 3 which has detected "0077" serving as the carrier number 1a included in the originator information 1 is connected to the carrier 4 corresponding to the number. The connected carrier 4 reads the identifier 1c included in the originator information 1 to perform determination in step a1. In the case where the identifier is 01 to 09, the flow proceeds to step a2. In step a2, the contents of the identifier 1c are recognized as a sub-address, and the sub-address is added to the carrier control signal 6 transmitted to the called terminal unit 10. When it is determined that the identifier is not 01 to 09 in step a1, the flow proceeds to step a3. When the identifier 1c included in the originator information 1 is "10" in step a3, the flow proceeds to step a4. In step a4, the contents of the identifier 1c are recognized as a message, and message information is added to the carrier control signal 6 transmitted to the called terminal unit 10.

When information is added to the carrier control signal 6 in step a2 or step a4, the flow proceeds to step a5. In step a5, as the carrier information 6b for identifying a carrier, "*07" is added to the carrier control signal 6 transmitted to the called terminal unit 10. When it is determined that the identifier 1c is not "10" in step a3, the flow proceeds to step a6. In step a6, a normal termination operation is performed. Upon completion of the process in step a5 or step a6, the operation procedure is ended by the carrier control signal 6.

As shown in FIG. 4, in a termination operation in the called terminal unit 10, the carrier control signal 6 is transmitted to the main controller 13 through the line interface 12. In step b1, the carrier-information-identifying means 21 in the main controller 13 identifies the carrier information 6b included in the carrier control signal 6. In the case where the carrier information 6b is "*07" representing the carrier 4, the flow proceeds to step b2. In step b2, the carrier-service-information-identifying means 22 identifies the carrier service information 6c included in the carrier control signal 6 to compare the carrier service information 6c with storage contents of service information stored in the carrier service information storing means 23 and provided by the carrier 4. In the case where it is found as a comparison result that the carrier service information 6c is a sub-address, the flow proceeds to step b3. Instep b3, a control signal for individual terminal connection of the main controller 13 is transmitted to the terminal selecting circuit 14, and the terminal 15 of selected terminal-number 01 is connected to the communication network 2 through the line interface 12 and the terminal selecting circuit 14.

In the case where it is determined as a comparison result in step b2 that the carrier service information 6c is not a sub-address, the flow proceeds to step b4. In step b4, it is determined whether or not the comparison result in step b2 is a message. When the result is a message, the flow proceeds to step b5. Instep b5, a control signal for displaying the message is transmitted from the main controller 13 to the display unit 17 to display the message detected by the carrier-service-information-identifying means 22. When it is determined that the comparison result in step b4 is not a message, a normal termination process is performed in step b6. In the case where it is determined in step b1 that the carrier information 6b is not "*07", the flow proceeds to step b7. In step b7, it is determined whether or not the carrier information 6b designates the carrier 5 by "*08". In the case where the carrier 5 is designated, the flow proceeds to step b8 to perform information processing of the carrier 5. The information processing of the carrier 5 can be also performed by the same procedure as that performed for the carrier 4 in steps b2 to b6. When it is determined in step b7 that the carrier information 6b is not "*08", the flow proceeds to step b6 to perform a normal termination process. Upon completion of the process in step b3, step b5, step b6, or step b8, the operation as the called terminal unit 10 is also ended.

In this embodiment, the case that the two carriers 4 and 5 are used has been described above. In the case where three or more carriers are utilized, an information service provided by using the carrier information 6b and the carrier service information 6c can be similarly utilized. Also, the terminals 15 and 16 serving as slave units for the master unit 11 may be connected through a wire such as a signal cable or an optical fiber.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A communication apparatus connected to a communication network in which a plurality of carriers respectively provide unique information services, comprising:

carrier-identifying means for identifying a carrier on the basis of carrier information included in a control signal from the communication network; and information processing means for extracting information related to an information service unique to the carrier on the basis of the carrier information identified by the carrier-identifying means to perform a process which is predetermined for the extracted information.

2. The communication apparatus of claim 1, wherein the information processing means comprises:

service-identifying means for, on the basis of predetermined service information, identifying an information service provided by the carrier identified by the carrier-identifying means when a plurality of terminal units are connected thereto; and terminal inter-calling means for inter-calling a terminal unit corresponding a designated terminal-number when the service information identified by the service-identifying means is a terminal designation number.

3. The communication apparatus of claim 1, wherein the information processing means comprises:

service-identifying means for, on the basis of predetermined service information, identifying a information service provided by the carrier identified by the carrier-identifying means; and message processing means for, when the service information identified by the service-identifying means is message information, performing a predetermined process for the message information.

4. The communication apparatus of claim 1, wherein the communication network has a function of transmitting originator information to a called terminal unit, and the called terminal unit processes the originator information transmitted from the communication network.

5. The communication apparatus of claim 2, wherein the communication network has a function of transmitting originator information to a called terminal unit, and the called terminal unit processes the originator information transmitted from the communication network.

6. The communication apparatus of claim 3, wherein the communication network has a function of transmitting originator information to a called terminal unit, and the called terminal unit processes the originator information transmitted from the communication network.

7. A communication method utilizing a communication network having a function of transmitting originator information to a called terminal unit at the time of termination, the method comprising:

making the communication network available for selection of a plurality of carriers; and transmitting carrier-identifying information unique to a selected carrier together with the originator information from the communication network to the called terminal unit.

8. The communication method of claim 7, wherein when a terminal-number of the called terminal unit and additional information are inputted by an originating terminal unit, carrier service information corresponding to the additional information is transmitted together with the originator information and the carrier-identifying information from the communication network to the called terminal unit.

* * * * *